United States Patent
Yang et al.

(10) Patent No.: US 11,416,815 B1
(45) Date of Patent: Aug. 16, 2022

(54) SYSTEMS AND COMPUTERIZED METHODS FOR BALANCING INVENTORY

(71) Applicant: Coupang Corp., Seoul (KR)

(72) Inventors: Hyeong Bae Yang, Gyeonggi-do (KR); Dong Hyun Jin, Seoul (KR); Hyo Beom Park, Seoul (KR); Kyu Hoon Lim, Seoul (KR); Je Kim, Bellevue, WA (US); Smita Mohan, Seoul (KR); Hernan Awad Amar, Bellevue, WA (US)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/345,674

(22) Filed: Jun. 11, 2021

(51) Int. Cl.
*G06Q 10/08* (2012.01)
*G06Q 10/06* (2012.01)
*G06Q 30/02* (2012.01)

(52) U.S. Cl.
CPC ..... *G06Q 10/087* (2013.01); *G06Q 10/06315* (2013.01); *G06Q 30/0201* (2013.01); *G06Q 30/0205* (2013.01)

(58) Field of Classification Search
CPC ........... G06Q 10/087; G06Q 10/06315; G06Q 30/0202
See application file for complete search history.

(56) References Cited

U.S. PATENT DOCUMENTS

| 10,956,865 | B1 * | 3/2021 | Kim ................... G06Q 10/0875 |
| 2006/0136354 | A1 | 6/2006 | Bell et al. |
| 2017/0323250 | A1 | 11/2017 | Lindbo et al. |
| 2019/0259043 | A1 * | 8/2019 | Koneri ................... G06N 7/005 |
| 2020/0057981 | A1 | 2/2020 | Partin et al. |
| 2020/0082487 | A1 | 3/2020 | Kishikawa et al. |

FOREIGN PATENT DOCUMENTS

| JP | 6651517 B2 | 2/2020 |
| JP | 2020042354 A | 3/2020 |
| KR | 10-1974312 | 4/2019 |
| WO | WO-2018169739 A1 * | 9/2018 ........... G06Q 10/087 |

OTHER PUBLICATIONS

International Search Report and Written Opinion of the International Search Authority for International Application No. PCT/IB2021/056861, dated Mar. 8, 2022 (7 pages).
Office Action in counterpart Korean Application No. KR 10-2021-0149967 dated Jan. 10, 2022 (9 pages).
Decision of Patent Grant in counterpart Korean Application No. 10-2021-0149967 dated Jul. 4, 2022 (4 pages).

* cited by examiner

*Primary Examiner* — A. Hunter Wilder
(74) *Attorney, Agent, or Firm* — Finnegan, Henderson, Farabow, Garrett & Dunner LLP

(57) ABSTRACT

The present disclosure provides a computerized method for item distribution, including retrieving, from a data structure, an inventory of a SKU at each of a plurality of destinations; determining a buffer of each of the destinations; determining an average buffer across the destinations; identifying at least one high utilization destination and at least one low utilization destination based on differences from the average buffer; and redistributing a network inventory by, iteratively and for each of the high utilization destinations: finding, in the data structure, a low utilization destination having a common attribute with the high utilization destination; and sending, to a user device for display, an instruction to transfer a redistribution quantity of the SKU from the low utilization destination to the high utilization destination.

18 Claims, 9 Drawing Sheets

SYSTEMS AND COMPUTERIZED METHODS FOR BALANCING INVENTORY

TECHNICAL FIELD

The present disclosure generally relates to computerized systems and methods for balancing inventory of a distribution network. In particular, embodiments of the present disclosure relate to inventive and unconventional systems and methods utilized for distributing inventory across multiple fulfillment centers based on regional demand and fulfillment center capabilities.

BACKGROUND

E-commerce has introduced consumers to a wider variety of goods than previously available in physical stores. Online retailers are able to sell a significantly larger number of stock keeping units (SKUs) thanks to modern order tracking and database systems. This provides consumers with more choices and increases overall sales volume as compared to physical stores which may have fewer SKUs and less inventory of each SKU due to constraints on physical space.

Online retailers, however, are at a disadvantage compared to physical stores in that a consumer must wait for shipping and handling to occur before acquiring a purchase. In contrast, a consumer may immediately purchase an item from a physical store, assuming that the item is in stock.

Thus, online retailers in recent years have strived to reduce shipping times to provide goods to consumers as quickly as possible. While past shipment times may have been on the order of weeks, modern online retailers often promise delivery of goods to a consumer by the next day, or even the same day or in as little as a few hours of purchase.

Providing such quick shipping and handling times, however, requires complex supply chain management to order a required quantity of a SKU from a manufacturer or other supplier to meet customer demand. Further, distributors may stage goods throughout a region in anticipation of future purchases. Staging goods across multiple storage locations or fulfilment centers is traditionally performed by simply providing equal shares of an inventory to each fulfilment center.

However, these equal share methods often oversimplify the task of staging goods. For example, fulfilment centers may differ by having greater capacity, serving more customers, serving customers with differing preferences, or having different handling capabilities. These differences may result due to property availability in various regions. For instance, a rural fulfillment center may have more capacity than an urban center due to the price of real estate. Local regulations may also affect fulfillment center capabilities, as an urban fulfillment center may be unable to accommodate large trucks due to city street regulations.

Further, traditional methods may only provide an initial distribution of goods. However, variations in consumer habits may result in disproportionate consumption of goods at one fulfillment center, resulting in low inventory and shipping delays to consumers served by that fulfillment center. Further still, sales, deliveries, and shipments are often measured as rates, such as units sold per hour, and these rates often accelerate and decelerate rapidly. Distributors may attempt to estimate these values based on historical sales data. However, these methods omit other variables, such as variations in warehouse storage space and capabilities, due to an inability to measure and combine many rapidly fluctuating data streams to produce tailored purchase orders. As a result, inventory imbalances occur, inventory is wasted, customers become dissatisfied due to long delivery times, and profits are lost.

Accordingly, there is a need for improved methods and systems that optimize initial distribution of goods based on fulfillment center capabilities, and also provide methods to detect and resolve imbalances in inventory due to fluctuation consumption patterns, based on re-time data reporting of warehouse capacity of a SKU across multiple fulfillment centers.

SUMMARY

One aspect of the present disclosure is directed to a computerized system for item distribution, comprising at least one processor; and at least one non transitory storage medium storing instructions that, when executed by the at least one processor, cause the at least one processor to perform steps. The steps comprise retrieving, from a data structure, an inventory of a SKU at each of a plurality of destinations; determining a buffer of each of the destinations; determining an average buffer across the destinations; identifying at least one high utilization destination and at least one low utilization destination based on differences from the average buffer; and redistributing a network inventory by, iteratively and for each of the high utilization destinations: finding, in the data structure, a low utilization destination having a common attribute with the high utilization destination; and sending, to a user device for display, an instruction to transfer a redistribution quantity of the SKU from the low utilization destination to the high utilization destination.

Another aspect of the present disclosure is directed to a computer-implemented method for item distribution, comprising retrieving, from a data structure, an inventory of a SKU at each of a plurality of destinations; determining a buffer of each of the destinations; determining an average buffer across the destinations; identifying at least one high utilization destination and at least one low utilization destination based on differences from the average buffer; and redistributing a network inventory by, iteratively and for each of the high utilization destinations: finding, in the data structure, a low utilization destination having a common attribute with the high utilization destination; and sending, to a user device for display, an instruction to transfer a redistribution quantity of the SKU from the low utilization destination to the high utilization destination.

Yet another aspect of the present disclosure is directed to a computer-implemented method for item distribution, comprising: retrieving, from a data structure, a first inventory of a first SKU at each of a plurality of destinations; determining a buffer of each of the destinations; determining an average buffer across the destinations; identifying at least one high utilization destination and at least one low utilization destination based on differences from the average buffer; and redistributing a network inventory by, iteratively and for each of the high utilization destinations: retrieving, from the data structure, a second inventory of a second SKU at the high utilization destination, the second SKU having a lower urgency attribute than an urgency attribute of the first SKU; sending, to a user device for display, a first instruction to transfer at least a portion of the second inventory from the high utilization destination; identifying a short-term tranche and a long-term tranche of the first inventory of the high utilization destination; finding, in the data structure, a low utilization destination having a common region attribute with the high utilization destination; sending, to the user device for display, a second instruction to transfer a first redistribution quantity of the SKU corresponding to a size of the short-term tranche from the low utilization destination to the high utilization destination; and sending, to the user device for display, a third instruction to transfer a second redistribution quantity corresponding to a size of the long-term tranche from a destination having a different region attribute than the high utilization location to at least one destination having a common region attribute as the high utilization location.

Other systems, methods, and computer-readable media are also discussed herein.

DETAILED DESCRIPTION

Figure 1A:
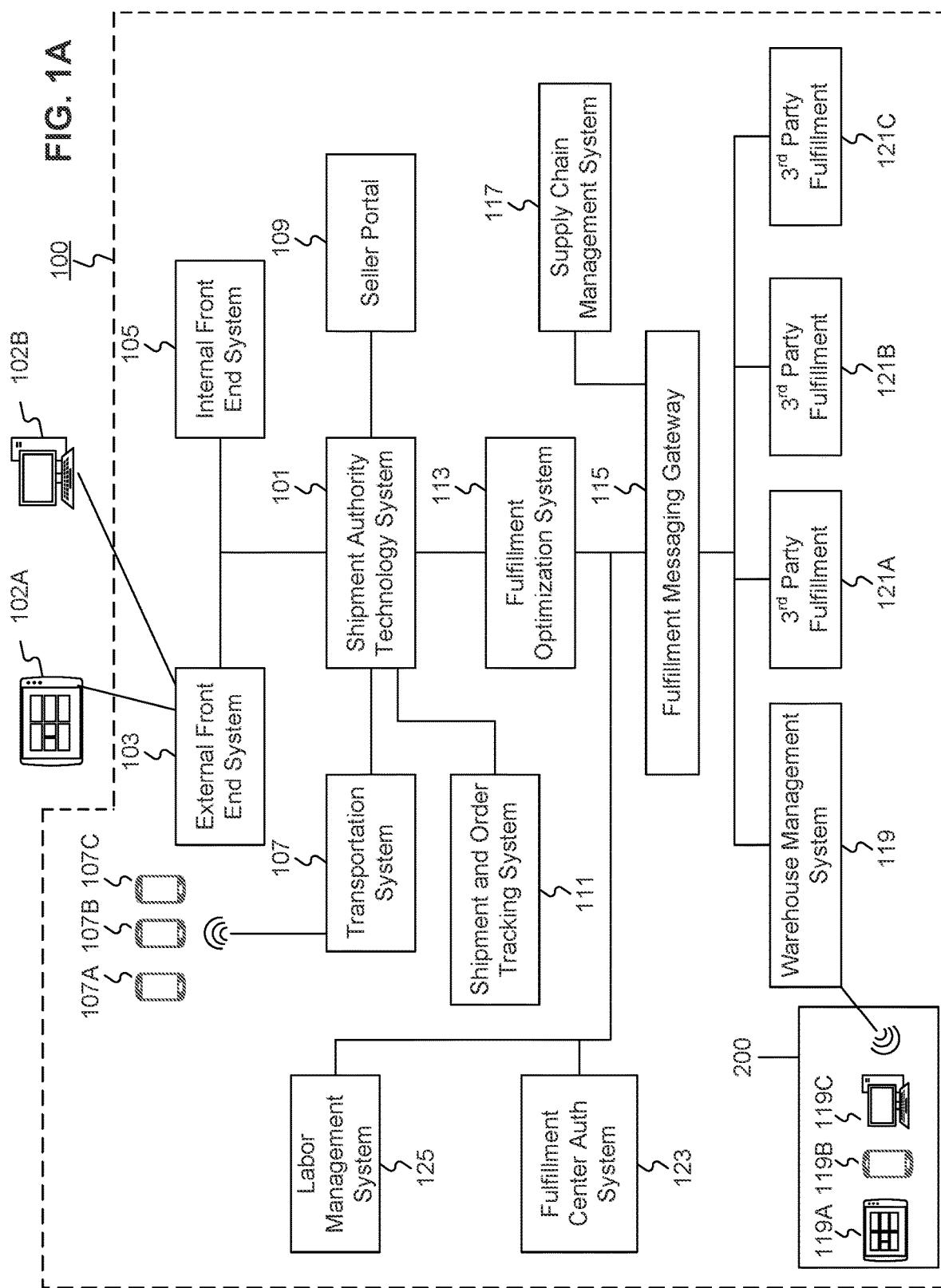
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods for incorporating data from multiple data sources, which may be retrieved or reported live, into inventory requirement predictions and to predict inventory shortfalls optimize inventory distribution, and automatically balance inventories at destinations, according to real-time conditions.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
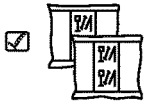
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
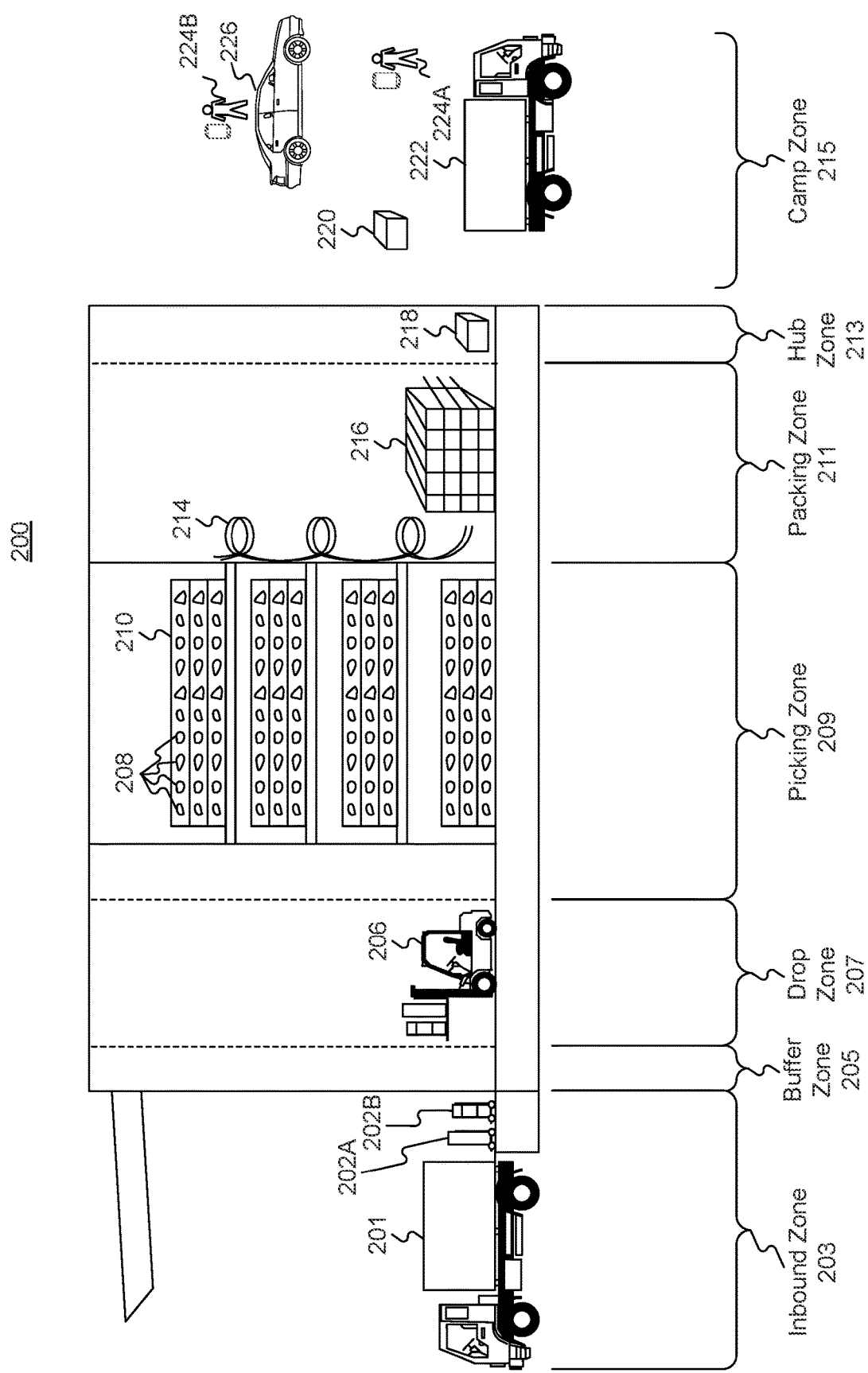
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC)

200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
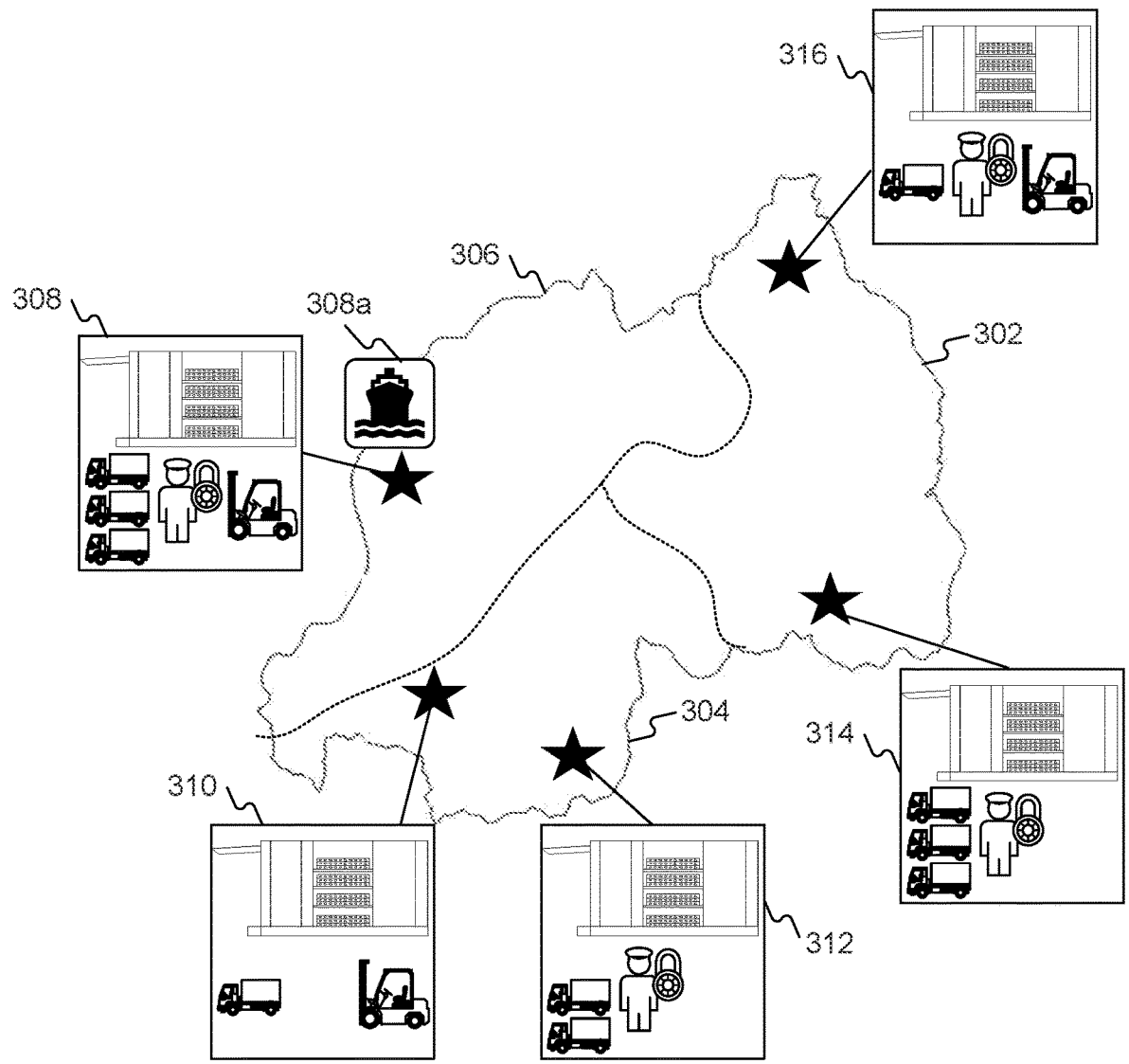
FIG. 3 is an illustration of destination locations and capacities, consistent with the disclosed embodiments.

FIG. 3 is an illustration of destination locations and capacities, consistent with the disclosed embodiments. In FIG. 3, a geographic area (e.g., a country, a county, a city, or other political/geographical subdivision) is divided into three regions, region 302, region 303, and region 306. Each region has at least one destination. A destination a destination may be, but is not necessarily, a fulfillment center 200. A destination may also be a warehouse that stores goods prior to sending to a fulfillment center 200. For instance, region 304 has two destinations 310 and 312. Thus, regions may have different numbers of destinations. This example diagram is not intended to be limiting, as a geographic area may have more than three regions, more than five destinations, and more destinations in each region. Attributes and data about each region and destination may be stored in a data store. Further, SCM system 117 may query a WMS 119 associated with each of a plurality of destinations to acquire attributes of the destinations. Further still, SCM system 117 may regularly query destinations for live updates of attributes, such as if the destination has been closed due to weather, employment issues, and the like.

Further, destinations may have differing capacities, throughput, inventories, and capabilities. For example, destination 310 has forklift capability and a loading dock for a truck. Destination 312 has two loading docks, as well as security, but does not have a forklift. Meanwhile, destination 308 has three loading docks, security, and a forklift. Thus, destinations 308, 312, 314, and 316 may be able to process high value items due to the presence of security guards, while destination 310 is limited to low value items. Destinations 308 and 314 may have high throughput rates due to more loading docks, as compared to destination 312 with two loading docks, and destinations 310 and 316 with one loading dock. Throughput may also represent a number of employees and equipment available to package goods, and a number of delivery vehicles available to take goods to consumers. Further, destinations 308, 310, and 316 may be able to handle large, heavy packages due to the forklift capability present at those destinations, while destinations 312 and 314 are limited to smaller, hand-carried items. Additionally, SCM system 117 may query a WMS 119 associated with the destination, or the data store, periodically, or in real-time, to obtain live updates of destination attributes, such as if forklifts are unavailable due to maintenance, a loading dock is broken, employees are sick, security guards are on leave, and the like.

Destinations may also have varying storage capacities, as well, based on, for instance, warehouse size. Capacity may be SKU-specific, indicating, for instance, that a destination may store 150 televisions. Capacity may be SKU-agnostic, indicating open space that can store any of a plurality of items, individually or in combination.

Throughput of destinations may be based on consumption habits of nearby customers. For example, books may be frequently purchased in region 304, while video games may be frequently purchased in region 302. Therefore, destinations 310 and 312 may have a larger inventory and required reserve of books than video games, while destinations 314 and 316 may have a larger inventory and required reserve of video games than books.

Destination capability may vary over time. For example, a forklift at a destination may break, eliminating a destination's capability to handle heavy goods, at least temporarily. Regional boundaries may be based on geographic constraints, such as a difficulty of transporting goods across a mountain range forming a border between regions. Regional boundaries may be based on demographics, as well, such that regions have roughly similar population sizes, ages, consumption patterns, and the like. Destinations within a region may function to supplement other destinations within the same region. For example, if destination 310 runs low on a certain SKU due to increased demand of nearby consumers, destination 312 may be used to meet orders for the nearby consumers. A distributor may prefer to supplement inventory of one destination by other destinations in the same region, rather than destinations in a different region to reduce shipping delays to a consumer. For instance, if destination 310 runs out of inventory of a SKU, but consumers have been promised next day delivery, a distributor may still meet the next day delivery promise by shipping from destination 312 which is nearby. However, if items are shipped from destination 316 to consumers near destination 310, the items may be delayed due to transportation time and the distributor may fail to deliver the items on time.

Thus, destinations may have a plurality of attributes in common with other destinations, including region and destination capabilities. Further, destination capability may correspond to a security level, handling equipment availability, and dispatch throughput. For example, destination 314 and destination 308 have a common dispatch throughput attribute; destination 308 and destination 310 have a common handling equipment availability attribute; destination 314 and destination 312 have a common security level attribute; and destination 316 and destination 314 have a common region attribute.

Further, as shown in FIG. 3, destination 308 is associated with port 308a. Port 308a may be a location that receives goods directly from a manufacturer or other supplier, and destination 308 may be used to distribute goods from manufacturers to other destinations. Destination 308 may therefore have all destination capabilities, including a maximum possible throughput of 3, security, and forklift. In this way, destination 308 may be considered a primary destination that receives goods from a manufacturer, the primary destination being among the plurality of destinations. Further, the information reporting the capabilities and status of a destination may be stored in a data store and updated by automated reporting from WMS 119, for instance. SCM system 117 may query WMSs 119 for information on demand or periodically as well, and store the updates in a data store. A distributor may accept goods at the primary destination, which would then result in imbalance between the inventory of a SKU at the primary destination and the inventory of the SKU at other destinations. The distributor may then seek to balance the inventory across multiple destinations. Further, in some embodiments, the primary destination may also dispatch items directly to consumers, or may only dispatch items to other destinations which then ship to consumers.

Figure 4A:
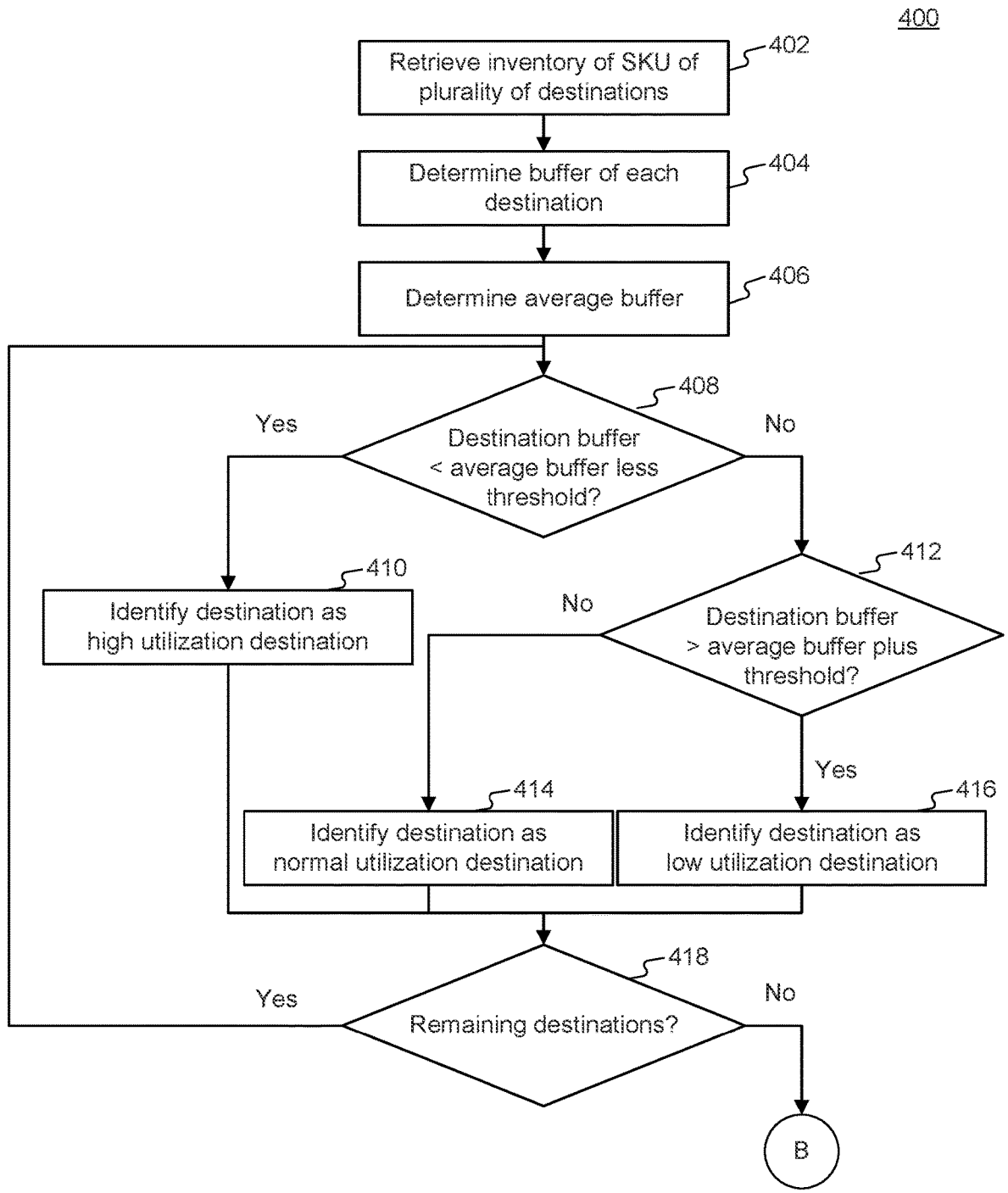
FIGS. 4A and 4B provide a flow chart illustrating an exemplary embodiment of an inventory balancing process, consistent with the disclosed embodiments.
Figure 4B:
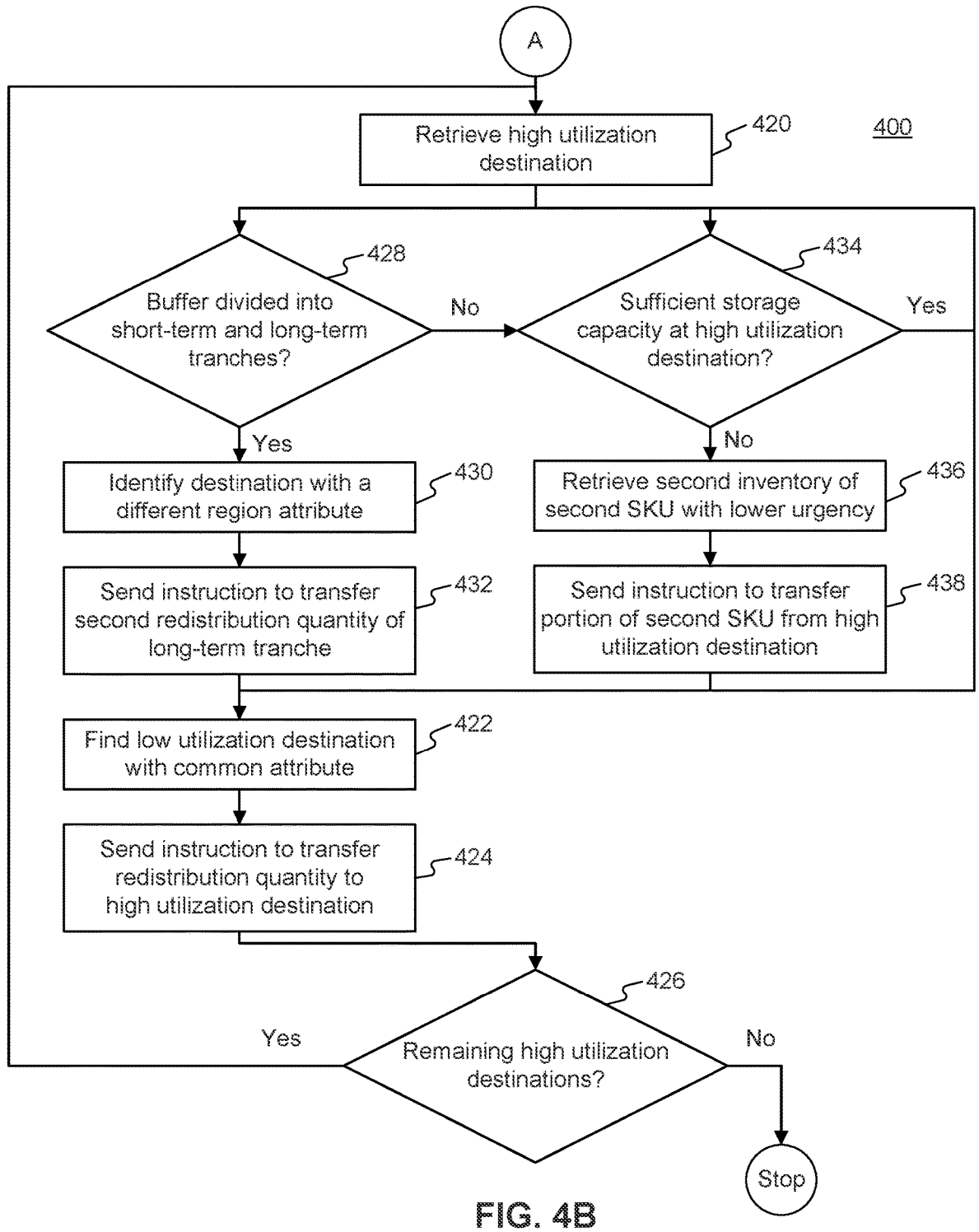

FIGS. 4A and 4B provide a flow chart illustrating an exemplary embodiment of an inventory balancing process, consistent with the disclosed embodiments. In some embodiments, process 400 shown in FIGS. 4A and 4B may be conceived as two interoperable subroutines. Steps 402-418 in FIG. 4A may be a first subroutine that determines the existence of inventory imbalances across a network of destinations. If the first subroutine identifies an inventory imbalance, process 400 may proceed to steps 420-438 of FIG. 4B, which may be a second subroutine that determines how to balance inventory after detecting an imbalance. SCM system 117 may run process 400 periodically, such as daily, or due to an event, such as a new delivery of goods at a primary destination or a report of low inventory from a destination.

In step 402, SCM system 117 may retrieve, from a data structure, an inventory of a SKU at each of a plurality of destinations. The data structure may be stored in a memory of SCM system 117, for instance. Alternatively, the data structure may be stored in a database accessible by SCM system 117, such as a database on a virtual server that receives attribute updates on destinations, such as via reports from WMSs 119. In some embodiments, SCM system 117 may retrieve inventory information and by retrieving inventory data from WMS 119 or FO system 113. SCM system 117 may also retrieve past supplier orders and past consumer purchases, such as from FO system 113, and calculate a current inventory.

At step 404, SCM system 117 may determine a buffer of each of the destinations. A buffer may be a determined as a period of time over which a distributor may meet consumer demand of a SKU using only current inventory. Step 404 may include an analysis of current inventory and past dispatch rates. For example, SCM system 117 may, in step 404, retrieve from the data structure, such as on a virtual server database or a memory, or a different data structure, a storage capacity and SKU dispatch history of the destination. The SKU dispatch history may be obtained from FO system 113, for example, or WMS 115, and correspond to a number of units of a SKU shipped to customers from the destination over a period of time. SCM system 117 may also calculate a SKU velocity as a ratio of a number of SKU items dispatched from the destination and an amount of time, and set the buffer of the destination as a ratio of the inventory to the SKU velocity.

For example, if a destination typically ships 300 boxes of tissues each day, it may have a SKU velocity of 300 units per day. Further, if the destination has an inventory of 1200 boxes, the destination may have 4 days of buffer. Step 404 may account for variable consumption rates, such as when purchases or shipments slow over a weekend in comparison to weekdays. Buffer may be measured on the basis of time periods of supplier shipments. In some cases, such as for large or expensive items, a supplier may provide monthly shipments of new inventory, and a destination may have a buffer of, for example, two months.

SCM system 117 may also determine the buffer based on a statistical confidence interval surrounding a historical consumption rate. For example, a distributor may wish to have a 99.9% likelihood of meeting consumer purchases with current inventory. Based on past consumption patterns, SCM system 117 may calculate a statistical distribution, such as a Gaussian distribution, of past consumption rates and determine a safety consumption rate below which 99.9% of consumption rates are expected to fall. SCM system 117 may then base the buffer on this safety consumption rate.

At step 406, SCM system 117 may determine an average buffer across the destinations. Based on the average buffer, SCM system 117 may identify at least one high utilization destination and at least one low utilization destination based on differences from the average buffer by analyzing each of the plurality of destinations with steps 408-416.

At step 408, SCM system 117 may determine if a destination buffer is less than the average buffer less a threshold. For example, a destination buffer may be 5 days, the average buffer may be 10 days, and the threshold may be 2 days. Here, step 408 would be YES, because 5<10−2. SCM system 117 would then proceed to step 410 and identify the destination as a high utilization destination, indicating that the destination ships more units of a SKU than other destinations.

Alternatively, SCM system 117 may determine that the destination buffer is greater than the average buffer less a threshold. For example, the destination buffer may be 9 days, the average buffer may be 10, and the threshold may be 2. Step 408 would be NO, because 9 is not <10−2. SCM system 117 may then proceed to step 412 to determine if the destination buffer is greater than the average buffer plus the threshold. In the previous example of a 9 day buffer, step 412 would be NO, because 9<10+2. SCM system 117 may then proceed to step 414 and identify the destination as a normal utilization destination. However, if the destination of the previous example had a 14 day buffer, step 412 would be YES, because 14>10+2. SCM system 117 would then identify the destination as a low utilization destination at step 416, indicating that the destination ships fewer units of a SKU than other destinations. In some embodiments, a lower threshold may be different than an upper threshold. For instance, the lower threshold may be 3, and the upper threshold may be 2, such that a buffer is a normal utilization buffer if it is between 7 (i.e., 10−3) and 12 (i.e., 10+2). This may allow a distributor to tolerate a wider range of high utilization buffers, while identifying additional low utilization destinations.

In other words, a distributor may accept buffer variation within a range, and distributor may seek to balance or shuffle inventories outside of the range. This may avoid incurring transportation costs with marginal improvements in overall inventory balance. Further, this technique improves upon traditional balancing software by potentially dampening inventory oscillations between destinations during a series of inventory transfers. For example, using live or near real-time updates of shipment rates, inventories, and sales rates, SCM system 117 may implement a control logic, such as a proportional/integral/derivative control system, by setting ranges that dampen inventory oscillations. For example, balancing inventory across destinations that have close buffers may result in back-and-forth shipments that waste transportation time and resources. SCM system 117 may store utilization categories (high, normal, and low) in a memory or data structure for use in steps 420-436.

After SCM system 117 has categorized a destination as high, normal, or low utilization, SCM system 117 may proceed to step 418 and determine if there are remaining destinations to analyze. If there are remaining destinations that SCM system 117 has not yet analyzed, SCM system 117 may select another destination and return to step 408. Alternatively, if all destinations have been analyzed, step 418 is NO, and SCM system 117 may proceed to the remaining steps of process 400 illustrated in FIG. 4B.

SCM system 117 may proceed from step 418 to step 420 to retrieve a high utilization destination. SCM system 117 may advance to step 422 and find, in the data structure, a low utilization destination having a common attribute with the high utilization destination. The common attribute may be a region or destination capability, as previously described. In some embodiments, the low utilization destination may have common region attribute, common security level, and common handling equipment availability. For example, a large television may require security and forklifts for handling at a destination, and SCM system 117 may identify a low utilization destination that has security and forklifts at step 422.

Further, SCM system 117 may, at step 424, send to a user device for display, an instruction to transfer a redistribution quantity of the SKU from the low utilization destination to the high utilization destination. The instruction may be sent via email, text message, or other internal communication system, and received by a warehouse manager to effectuate a redistribution of goods from a low utilization location to the high utilization location. The redistribution quantity of the SKU may be based on a difference between the buffer of the destination and the average buffer. For example, if a high utilization destination ships 300 boxes of tissues per day and has 3 days of buffer, while the average buffer is 5 days, the redistribution quantity may be determined as (5-3)×300=600 boxes. In some embodiments, the redistribution quantity for different destinations may vary despite having similar buffer shortfalls, as the shipping rates for the destinations may differ.

Further, SCM system 117 may allocate the redistribution quantity to the high utilization destination, and de-allocate the redistribution quantity from the low utilization destination, in the data structure stored in a memory of SCM system 117, or in a database as described above. This may avoid replications of transfer instructions for a quantity of goods. Further, SCM system 117 may determine if the low utilization destination would be a normal utilization destination after transfer of the redistribution quantity, and change the identifier in the data structure associated with the low utilization destination to avoid re-tasking. In some embodiments, SCM system 117 may limit a transfer of goods from a low utilization destination such that the low utilization destination does not become a high utilization destination by having low inventory post-transfer. SCM system 117 may find another low utilization destination that can supply the entire redistribution quantity to reduce transportation costs, or may find multiple low utilization destinations to make up the redistribution quantity and send multiple transfer instructions.

At step 426, SCM system 117 may determine if there are remaining high utilization destinations. If there are remaining high utilization destinations, step 426 is YES, and SCM system 117 may return to step 420 to select an additional high utilization destination.

SCM system 117 may incorporate additional factors in redistributing the network inventory, as well. For example, SCM system 117 may determine, at step 428, if the buffer of a destination comprises a short-term tranche and a long-term tranche, and the redistribution quantity is based on a size of the short-term tranche. For example, a destination may store some units of a SKU in a warehouse for shipping in the short term or in low quantities, such as to retail consumers. These units may be broken down from bulk shipments for quick repackaging and shipment. The destination may also store some units of the SKU in a long-term storage, such as in a bulk form, as a backup capacity in case of a large surge in sales or for shipment to commercial customers. Long term storage quantities may also require special handling equipment, such as forklifts to handle pallets. Additionally, because long-term tranches may have longer periods before shipment, delays incurred by shipping from a different region may be acceptable, as opposed to short term tranches which may be shipped quickly.

Further, because long-term tranches may have a long period before shipment, the long-term tranches may be stored anywhere within a region while still addressing an overall regional buffer shortfall. For example, a pallet of tissue boxes may be kept in reserve in anticipation of a flu outbreak in a region and increased consumer demand. A destination may have a high utilization of its long-term tranche of tissues due, for instance to a commercial sale. An additional pallet of tissue boxes may be stored at any destination within the same region to address a long-term tranche shortfall.

SCM system 117 may therefore create a first redistribution quantity based on the size of the short-term tranche, and first instruction corresponding to the first redistribution quantity. The first redistribution quantity may be derived from a low utilization destination having a common region attribute, such that the first redistribution quantity may arrive at the high utilization destination quickly.

SCM system 117 may also redistribute long-term tranches. For instance, if SCM system 117 determines that the buffer is divided into a short-term tranche and a long-term tranche at step 428, SCM system 117 may, at step 430, identify a destination having a different region attribute than the high utilization location.

At step 432, SCM system 117 may send, to the user device for display, a second instruction to transfer a second redistribution quantity corresponding to a size of the long-term tranche from the destination having a different region attribute to at least one destination having a common region attribute as the high utilization location. In this manner, long-term tranches may be balanced across regions, in addition to or rather than balanced across individual destinations.

In some cases, a high utilization destination may be too full to store additional inventory to bring the buffer within a range desired by the distributor. For example, the high utilization location may be stocked with other SKUs and have full shelves, pallet parking spaces, or other volume measurements, such that there is no space for more inventory. Thus, in some embodiments, SCM system 117 may, at step 434, determine a vacant volume of the high utilization destination based on at least the inventory of the destination, and may also consider inventories of other SKUs if, for instance, storage space is fungible such that any SKU may be stored in the storage space. SCM system 117 may also determine the volume or storage space required for the redistribution quantity. In some embodiments, SKUs may be categorized by final shipment method to a customer. For example, certain SKUs, such as low value, non-fragile SKUs, may be shipped in a bag (i.e., "totable"). Higher-value or fragile SKUs may require shipment in a box with other packaging (i.e., "non-totable"). Other SKUs may be shipped in large quantities, or in original packaging from a manufacturer or supplier (i.e., "grande"). For example, boxes of toilet paper may be categorized as grande, as consumers may often purchase large quantities of toilet paper, and the boxes may be shipped from a destination to the consumer in the original packaging provided by the toilet paper manufacturer. Some storage spaces may therefore be tied to a SKU type, such that some storage space in a destination is allocated for total items, non-totable items, and grande items. For instance, grande items may be stored in an area with few obstructions such that forklifts may maneuver, while totable items may be stored on shelves.

If the destination has sufficient vacant volume to receive the redistribution quantity, step 434 is YES, and SCM system 117 may proceed to step 422.

However, if there is insufficient storage capacity, such that step 434 is NO, SCM system 117 may transfer low urgency items out of the high utilization destination to make additional space. Thus, the inventory may be a first inventory, and the SKU may be a first SKU. Further, SCM system 117 may, at step 436, retrieve, from the data structure, a second inventory of a second SKU, the second SKU having a lower urgency attribute than an urgency attribute of the first SKU. For example, the second SKU may have a lower urgency based on a lower profit margin or lower sales volume than the first SKU which has a low buffer. SCM system 117 may, at step 438, send, to the user device for display, an additional instruction to transfer at least a portion of the second inventory from the high utilization destination in response to the high utilization destination having insufficient storage capacity for the redistribution quantity. In this manner, SCM system 117 may ensure that the high utilization destination has sufficient inventory of the highly utilized SKU in place to meet customer demands.

In some cases, moving low urgency SKUs and separately handling long-term tranches via steps 428-438 may be insufficient to ensure that the high utilization destination can accommodate additional inventory to increase the buffer. SCM system 117 may therefore redistribute items to other destinations within a region thereby approximating short distribution times that would be possible if the inventory were placed at the high utilization destination.

For example, SCM system 117 may identify, by accessing the data structure, an alternate destination having a common region identifier with the high utilization destination in response to a volume of the redistribution quantity exceeding a storage capacity of the high utilization destination. SCM system 117 may send, to the user device for display, an additional instruction to transfer at least a portion of the redistribution quantity of the SKU from the low utilization destination to the alternate destination. The portion of the redistribution quantity may correspond to an excess volume of the redistribution quantity that cannot fit in the high utilization destination. In some cases, the portion may be the entire redistribution quantity.

As an exemplary embodiment of the present disclosure, a computer-implemented method for item distribution may include a plurality of steps. The steps may include retrieving, from a data structure, a first inventory of a first SKU at each of a plurality of destinations; determining a buffer of each of the destinations; determining an average buffer across the destinations. The method may also include identifying at least one high utilization destination and at least one low utilization destination based on differences from the average buffer; and redistributing a network inventory using the categorizations as high or low utilization. For example, the method also includes iteratively and for each of the high utilization destinations: retrieving, from the data structure, a second inventory of a second SKU at the high utilization destination, the second SKU having a lower urgency attribute than an urgency attribute of the first SKU; and sending, to a user device for display, a first instruction to transfer at least a portion of the second inventory from the high utilization destination.

Further, the method may include steps to allocate inventory according to short-term and long-term designations. For example, the method may further include identifying a short-term tranche and a long-term tranche of the first inventory of the high utilization destination; finding, in the data structure, a low utilization destination having a common region attribute with the high utilization destination; sending, to the user device for display, a second instruction to transfer a first redistribution quantity of the SKU corresponding to a size of the short-term tranche from the low utilization destination to the high utilization destination.

Further still, the method may include steps to distribute inventory throughout a region, including and sending, to the user device for display, a third instruction to transfer a second redistribution quantity corresponding to a size of the long-term tranche from a destination having a different region attribute than the high utilization location to at least one destination having a common region attribute as the high utilization location.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. For example, in some embodiments, steps may be substituted, replaced, added, or reordered in processes without deviating from the present disclosure. Further, in some embodiments, some steps may occur simultaneously. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

The invention claimed is:

1. A computerized system for item distribution, comprising:
   at least one processor; and
   at least one non transitory storage medium comprising instructions that, when executed by the at least one processor, cause the at least one processor to perform steps comprising:
   retrieving, from a data structure, a first inventory of a first SKU at each of a plurality of destinations;
   determining a buffer of each of the destinations;
   determining an average buffer across the destinations;

calculating differences between the buffer of each of the destinations and the average buffer across the destinations;

identifying at least one high utilization destination and at least one low utilization destination based on the calculated differences relative to a threshold difference, wherein the threshold difference is dynamically adjusted; and redistributing a network inventory by, iteratively and for each of the high utilization destinations:

determining that the high utilization destination has insufficient storage capacity for a redistribution quantity;

based on the determination, retrieving, from the data structure, a second inventory of a second SKU, the second SKU having a lower urgency attribute than an urgency attribute of the first SKU;

sending, to a user device for display, a first instruction to transfer at least a portion of the second inventory from the high utilization destination;

finding, in the data structure, a low utilization destination having a common attribute with the high utilization destination;

sending, to the user device for display, a second instruction to transfer the redistribution quantity of the first SKU from the low utilization destination to the high utilization destination, wherein the second instruction is converted from one format or protocol to another format or protocol prior to reception by the user device;

based on receiving the redistribution quantity at the high utilization destination in response to sending the second instruction, updating the first inventory of the first SKU at the low utilization destination and the high utilization destination based on the received distribution quantity.

2. The computerized system of claim 1, wherein a primary destination receives goods from a manufacturer, the primary destination being among the plurality of destinations.

3. The computerized system of claim 1, wherein determining the buffer of each of the destinations comprises, for each of the destinations:

retrieving, from the data structure, a SKU dispatch history of the destination;

calculating a SKU velocity as a ratio of a number of SKU items dispatched from the destination and an amount of time; and setting the buffer of the destination as a ratio of the inventory to the SKU velocity.

4. The computerized system of claim 1, wherein the buffer of a destination comprises a short-term tranche and a long-term tranche, and the redistribution quantity is based on a size of the short-term tranche.

5. The computerized system of claim 4, wherein the redistribution quantity is a first redistribution quantity; and redistributing the network inventory further comprises:

sending, to the user device for display, a third instruction to transfer a second redistribution quantity corresponding to a size of the long-term tranche from a destination having a different region attribute than the high utilization location to at least one destination having a common region attribute as the high utilization location.

6. The computerized system of claim 1, wherein redistributing the network inventory further comprises:

identifying, by accessing the data structure, an alternate destination having a common region identifier with the high utilization destination in response to a volume of the redistribution quantity exceeding a storage capacity of the high utilization destination; and sending, to the user device for display, an additional instruction to transfer at least a portion of the redistribution quantity of the SKU from the low utilization destination to the alternate destination.

7. The computerized system of claim 1, wherein the common attribute corresponds to at least one of a region or a destination capability.

8. The computerized system of claim 7, wherein the destination capability corresponds to a security level, handling equipment availability, and dispatch throughput.

9. The computerized system of claim 8, wherein the low utilization destination has a common region attribute, common security level, and common handling equipment availability.

10. A computerized-implemented method for item distribution, comprising:

retrieving, from a data structure, a first inventory of a first SKU at each of a plurality of destinations;

determining a buffer of each of the destinations;

determining an average buffer across the destinations;

calculating differences between the buffer of each of the destinations and the average buffer across the destinations;

identifying at least one high utilization destination and at least one low utilization destination based on the calculated differences relative to a threshold difference, wherein the threshold difference is dynamically adjusted; and redistributing a network inventory by, iteratively and for each of the high utilization destinations:

determining that the high utilization destination has insufficient storage capacity for a redistribution quantity;

based on the determination, retrieving, from the data structure, a second inventory of a second SKU, the second SKU having a lower urgency attribute than an urgency attribute of the first SKU;

sending, to a user device for display, a first instruction to transfer at least a portion of the second inventory from the high utilization destination;

finding, in the data structure, a low utilization destination having a common attribute with the high utilization destination;

sending, to the user device for display, a second instruction to transfer the redistribution quantity of the first SKU from the low utilization destination to the high utilization destination, wherein the second instruction is converted from one format or protocol to another format or protocol prior to reception by the user device;

based on receiving the redistribution quantity at the high utilization destination in response to sending the second instruction, updating the first inventory of the first SKU at the low utilization destination and the high utilization destination based on the received distribution quantity.

11. The computer-implemented method of claim 10, wherein a primary destination receives goods from a manufacturer, the primary destination being among the plurality of destinations.

12. The computer-implemented method of claim 10, wherein determining the buffer of each of the destinations comprises, for each of the destinations:
   retrieving, from the data structure, a SKU dispatch history of the destination;
   calculating a SKU velocity as a ratio of a number of SKU items dispatched from the destination and an amount of time;
   setting the buffer of the destination as a ratio of the inventory to the SKU velocity.

13. The computer-implemented method of claim 10, wherein the buffer of a destination comprises a short-term tranche and a long-term tranche, and the redistribution quantity is based on a size of the short-term tranche.

14. The computer-implemented method of claim 13, wherein
   the redistribution quantity is a first redistribution quantity; and
   redistributing the network inventory further comprises:
      sending, to the user device for display, a third instruction to transfer a second redistribution quantity corresponding to a size of the long-term tranche from a destination having a different region attribute than the high utilization location to at least one destination having a common region attribute as the high utilization location.

15. The computer-implemented method of claim 10, wherein redistributing the network inventory further comprises:
   identifying, by accessing the data structure, an alternate destination having a common region identifier with the high utilization destination in response to a volume of the redistribution quantity exceeding a storage capacity of the high utilization destination; and
   sending, to the user device for display, an additional instruction to transfer at least a portion of the redistribution quantity of the SKU from the low utilization destination to the alternate destination.

16. The computer-implemented method of claim 10, wherein the common attribute corresponds to at least one of a region or a destination capability.

17. The computer-implemented method of claim 16, wherein the destination capability corresponds to a security level, handling equipment availability, and dispatch throughput.

18. A computerized-implemented method for item distribution, comprising:
   retrieving, from a data structure, a first inventory of a first SKU at each of a plurality of destinations;
   determining a buffer of each of the destinations;
   determining an average buffer across the destinations;
   identifying at least one high utilization destination and at least one low utilization destination based on differences from the average buffer; and
   redistributing a network inventory by, iteratively and for each of the high utilization destinations:
      retrieving, from the data structure, a second inventory of a second SKU at the high utilization destination, the second SKU having a lower urgency attribute than an urgency attribute of the first SKU;
      sending, to a user device for display, a first instruction to transfer at least a portion of the second inventory from the high utilization destination;
      identifying a short-term tranche and a long-term tranche of the first inventory of the high utilization destination;
      finding, in the data structure, a low utilization destination having a common region attribute with the high utilization destination;
      sending, to the user device for display, a second instruction to transfer a first redistribution quantity of the SKU corresponding to a size of the short-term tranche from the low utilization destination to the high utilization destination, wherein the second instruction is converted from one format or protocol to another format or protocol prior to reception by the user device;
      based on receiving the first redistribution quantity at the high utilization destination in response to sending the second instruction, updating the first inventory of the first SKU based on the received first distribution quantity;
      sending, to the user device for display, a third instruction to transfer a second redistribution quantity corresponding to a size of the long-term tranche from a destination having a different region attribute than the high utilization location to at least one destination having a common region attribute as the high utilization location.

* * * * *